L. J. E. COLARDEAU & J. RICHARD.
STEREOSCOPIC DEVICE OR THE LIKE.
APPLICATION FILED NOV. 29, 1912.

1,216,948.

Patented Feb. 20, 1917.
3 SHEETS—SHEET 1.

L. J. E. COLARDEAU & J. RICHARD.
STEREOSCOPIC DEVICE OR THE LIKE.
APPLICATION FILED NOV. 29, 1912.

1,216,948.

Patented Feb. 20, 1917.
3 SHEETS—SHEET 2.

UNITED STATES PATENT OFFICE.

LOUIS JOSEPH EMMANUEL COLARDEAU AND JULES RICHARD, OF PARIS, FRANCE.

STEREOSCOPIC DEVICE OR THE LIKE.

1,216,948. Specification of Letters Patent. Patented Feb. 20, 1917.

Application filed November 29, 1912. Serial No. 734,138.

*To all whom it may concern:*

Be it known that we, LOUIS JOSEPH EMMANUEL COLARDEAU, of 13 Rue de Navarin, and JULES RICHARD, of 25 Rue Melingue, both in the city of Paris, Republic of France, have invented a Stereoscopic Device or the like, of which the following is a full, clear, and exact description.

Our invention relates to improvements in stereoscopic apparatus and the like such as described in our Letters Patent No. 1073331. In apparatus of this kind the views to be examined are withdrawn one by one from a box in which they are arranged, lifted to a level with the eye pieces and brought toward them which permits of employing short focus eye pieces.

The object of the present improvements is to remove every cause of any strain on the eyes of the persons using these apparatus.

It has been found that a considerable fatigue of the eye is due to the sudden changes from a bright light to a complete darkness and vice-versa which take place when an opaque shutter is used for masking the eye pieces with a view to preventing the substitution of a plate to another to be seen. In order to avoid this inconvenience, the improved apparatus is provided with a translucent shutter and the vertically movable frame serving to raise the plate is cut out so that the passage of the light will not be prevented. In these conditions when the shutter which is preferably mounted on a parallelogram of Watt is brought in the path between the eye pieces and the views, there is no longer a complete darkness, but a dimmed lighting which does not affect the eyes.

In order that our invention may be more fully understood an apparatus embodying the features of our invention will be described hereafter by way of example, with reference to the accompanying drawings in which.

Figure 1:
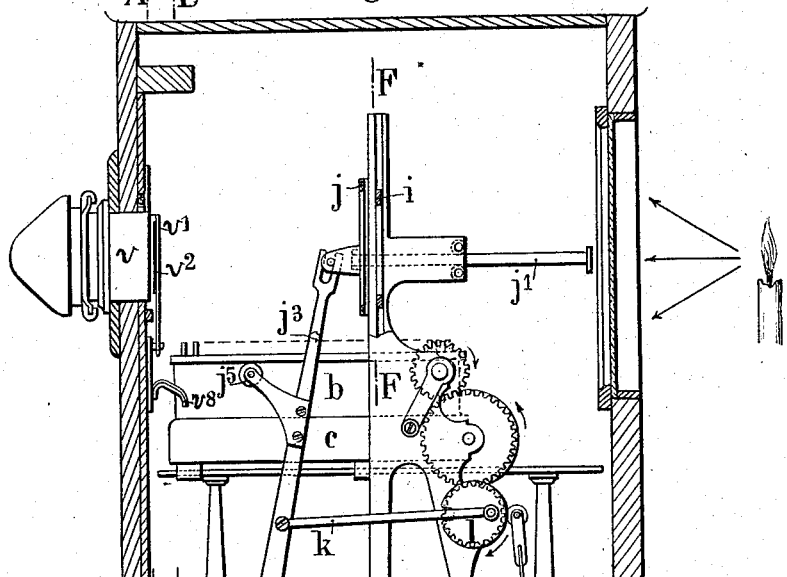
Figure 1 is a vertical section of the apparatus, made parallel to the optical axes of the eye pieces.
Figure 2:
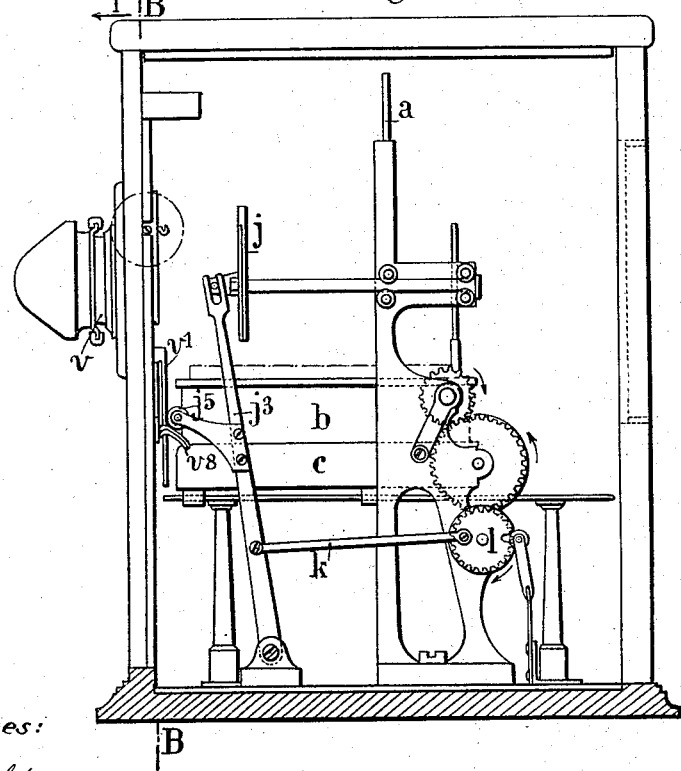
Fig. 2 is a similar section, the parts occupying another position.
Figure 3:
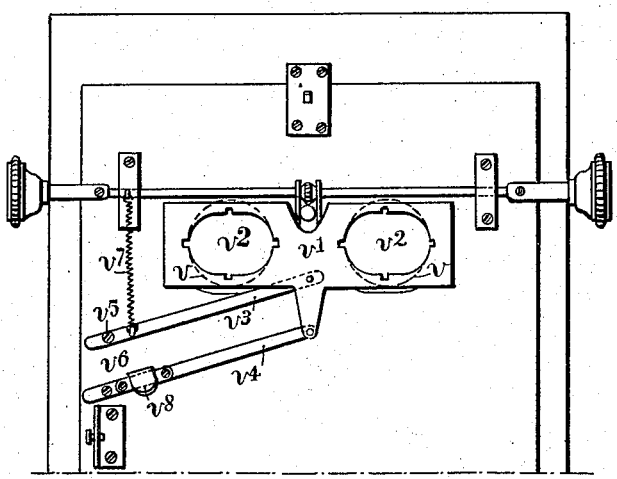
Figure 4:
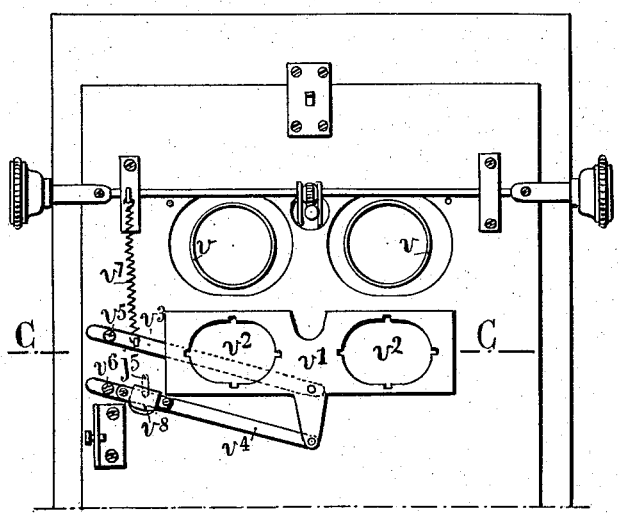

Figs. 3 and 4 are two sections made respectively on lines A—A and B—B of Figs. 1 and 2, looking in the direction of the arrow 1.

Figure 5:
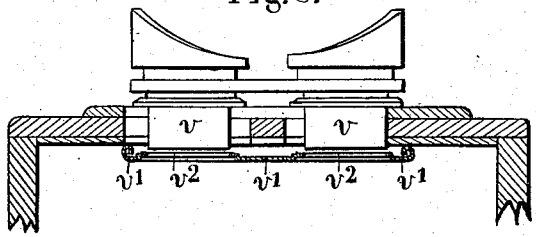

Fig. 5 is a horizontal section made on line C—C of Fig. 4.

Figure 6:
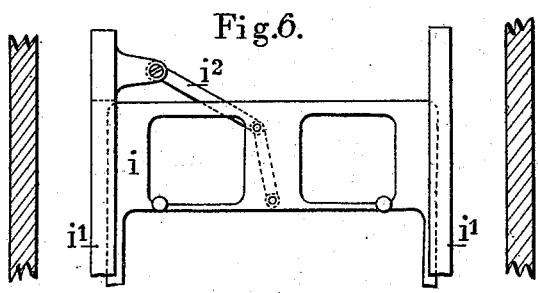

Fig. 6 is a section made on line F—F of Fig. 1.

The views to be examined are arranged in a box $b$ mounted on a suitable carrier $c$ adapted to be moved horizontally. As explained in the specification of our Letters Patent No. 1073331 the successive operations consisting in lifting each plate in succession out of the box, bringing it into the proper position for examination and replacing it in the box are effected by simply rotating the crank S constantly in the same direction, the direction of rotation being reversed after the last plate has been examined.

A plate extractor not shown first seizes a plate and a vertical frame $i$ mounted in slides $i'$ is then lifted by means of a lever $i^2$. This frame $i$ carries the plate upward until said plate engages a frame $j$ which is provided with a guiding rod $j'$ and is adapted to be moved horizontally toward the eye pieces $v$ by means of the rocking arm $j^3$, the connecting rod $k$ and the crank plate $l$, to bring the plate to the desired position. When the view has been examined a further rotation of the crank $s$ brings the plate back against the frame $i$ and then down into the box $b$, whereupon the following plate is seized by the extractor.

Behind the eye pieces $v$ is arranged a frame $v'$ having windows or openings $v^2$ provided with a sheet of translucent paper, a plate of ground glass, mica or the like. The frame $v'$ is carried by two levers $v^3$, $v^4$ hinged at $v^5$ and $v^6$ respectively. A returning spring $v^7$ tends to pull the frame upward for bringing it in the position illustrated in Figs. 1 and 3, in which it is placed opposite the eye pieces. Furthermore one of the levers is provided with a projection or heel piece $v^8$ which is adapted to coöperate with a roller $j^5$ mounted on the rocking arm $j^3$.

It results from this arrangement that when the arm $j^3$ moves for drawing the frame $j$ near the short focus eye pieces, the roller $j^5$ at the end of its travel encounters and depresses the projection $v^8$ (Fig. 2) whereby the frame $v'$ is lowered in the position illustrated in Fig. 4. The view can then be examined for any desired length of time.

When the driving crank $s$ is then operated to move the arm $j^3$ backward the roller $j^5$ leaves the projection $v^8$ and the frame $v'$ is brought back opposite the eye pieces. The eye pieces are therefore masked by the ground glasses or mica plates which have a certain clearness, very different from the complete darkness.

In order that the source of light $z$ which is placed behind the apparatus should not be masked by the vertical frame $i$ when the latter is lifted, this frame is cut out as illustrated in Fig. 6 so that it does not stop the passage of the light and sufficient lighting of the translucent portion of the frame $v'$ is insured.

It will be understood that the above arrangements are given by way of example only and the form, sizes and constructional details may be varied without modifying the principle of the invention.

Claims:

1. In a stereoscopic device of the kind described, eye pieces, a translucent shutter, and reciprocating view advancing means adapted to actuate said shutter to bring same into and out of the path between the eye pieces and the views.

2. In a stereoscopic device of the kind described, eye pieces, a translucent shutter normally positioned in a path between said eye pieces and the views, projections on said shutter, reciprocating view advancing means adapted at a determined moment to engage said projections to shift said shutter out of said path, and means to return said shutter to its former position upon the disengagement of the view advancing means from said projecting means.

3. In a stereoscopic device of the kind described, eye pieces, a movable shutter provided with translucent windows, a heel piece on said shutter, parallel links pivotally connected with said shutter, reciprocating view advancing means, a roller on said view advancing means adapted to engage said heel piece and to shift the shutter out of the path between the eye pieces and the views, and spring means to return said shutter into said path upon the disengagement of said roller from said heel piece.

The foregoing specification of our operating device for use in connection with apparatus for classifying and distributing photographic views signed by us this fifteenth day of November, 1912.

LOUIS JOSEPH EMMANUEL COLARDEAU.
JULES RICHARD.

Witnesses:
LUCIEN MEMMINGER,
R. THIRIOT.

Copies of this patent may be obtained for five cents each, by addressing the "Commissioner of Patents, Washington, D. C."